United States Patent
Burgstaler et al.

(10) Patent No.: US 6,918,319 B2
(45) Date of Patent: Jul. 19, 2005

(54) DEVICE FOR FIXING A PEDAL LEVER OF A MOTOR VEHICLE

(75) Inventors: Andree Burgstaler, Dielingen (DE); Jan Dütz, Damme (DE); Simone Pätzold, Cappeln (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 141 days.

(21) Appl. No.: 10/240,604

(22) PCT Filed: Jan. 31, 2002

(86) PCT No.: PCT/DE02/00350

§ 371 (c)(1),
(2), (4) Date: Oct. 1, 2002

(87) PCT Pub. No.: WO02/068248

PCT Pub. Date: Sep. 6, 2002

(65) Prior Publication Data

US 2003/0140728 A1 Jul. 31, 2003

(30) Foreign Application Priority Data

Feb. 6, 2001 (DE) .......................................... 101 05 546

(51) Int. Cl.⁷ ................................................. G05G 1/14
(52) U.S. Cl. .............................. 74/560; 74/512; 74/513
(58) Field of Search ........................... 74/512, 513, 560

(56) References Cited

U.S. PATENT DOCUMENTS 5,588,338 A * 12/1996 Carr et al. ..................... 74/560
5,896,781 A 4/1999 Muller
5,983,746 A * 11/1999 Nawata et al. ................ 74/512
6,112,615 A 9/2000 Nawata et al.
6,327,930 B1 * 12/2001 Ono et al. ..................... 74/512
2003/0056616 A1 * 3/2003 Matsumoto et al. .......... 74/512

FOREIGN PATENT DOCUMENTS

| DE | 195 15 852 | 11/1995 |
| DE | 197 18 384 | 11/1997 |
| DE | 196 31 212 | 12/1997 |
| DE | 297 15 372 | 1/2000 |
| EP | 1 074 445 | 2/2001 |
| GB | 2 352 430 | 1/2001 |
| WO | WO 99/59844 | 11/1999 |

* cited by examiner

Primary Examiner—David A. Bucci
Assistant Examiner—Bradley J. Van Pelt
(74) Attorney, Agent, or Firm—McGlew and Tuttle, P.C.

(57) ABSTRACT

A device for mounting a pedal lever (1) of a motor vehicle, which is accommodated in a housing (3) pivotably around at least one severable bearing element (2). A separating wedge (5), is supported on one side against a motor vehicle component (7). The separating wedge (5) is arranged facing the bearing element (2) with at least one cutting edge (4) provided at the separating wedge (5). As such the bearing element (2) is shorn off by the separating wedge (5) as a consequence of the action of an external force, which may be caused, e.g., by an accident, due to a relative movement between the separating wedge (5) and the bearing element (2).

20 Claims, 2 Drawing Sheets

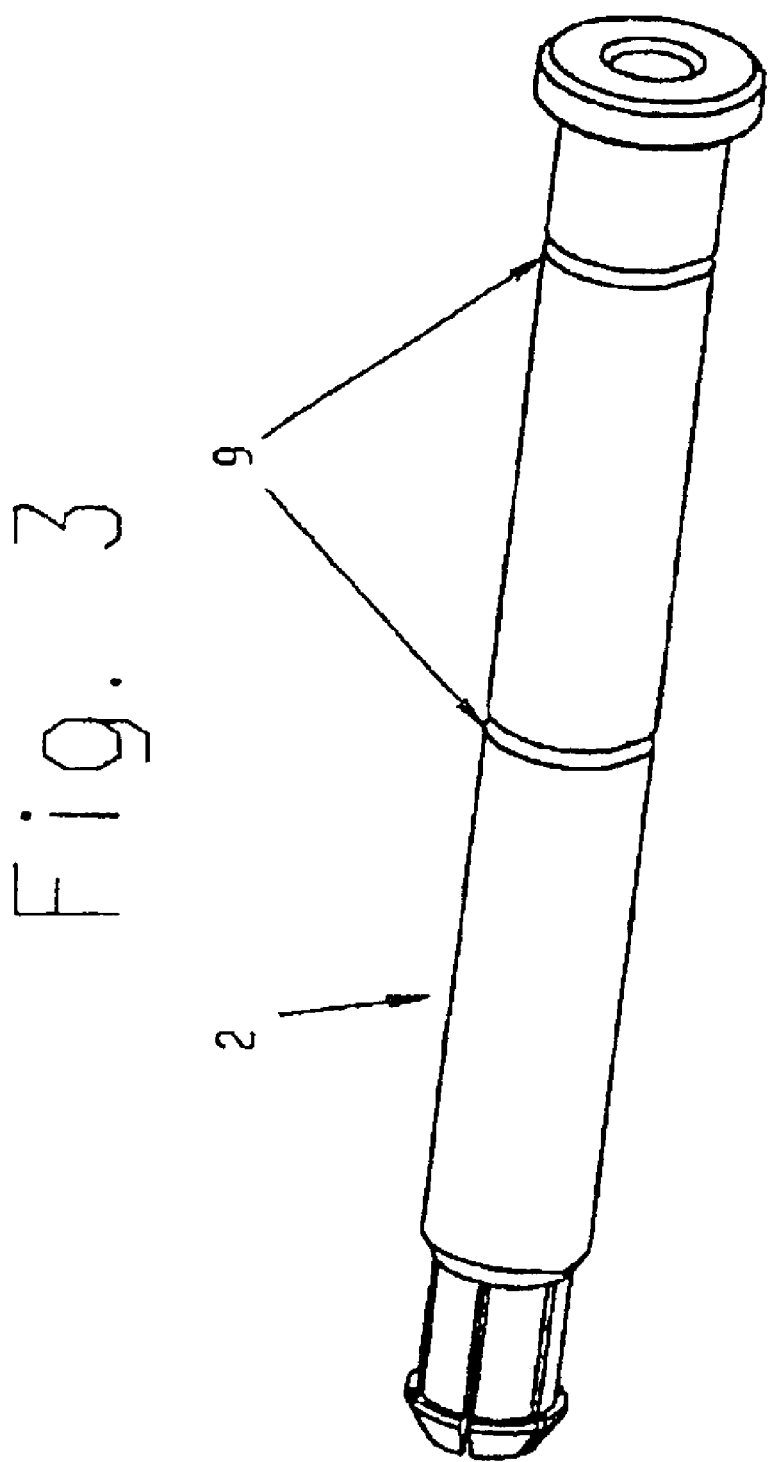

DEVICE FOR FIXING A PEDAL LEVER OF A MOTOR VEHICLE

FIELD OF THE INVENTION

The present invention pertains to a device for mounting a pedal lever for a motor vehicle, which is accommodated in a housing pivotably around at least one severable bearing element.

BACKGROUND OF THE INVENTION

The increasing requirements imposed on motor vehicles concerning an increase in safety are reflected in numerous systems. In the case of pedal fastening means, there is a known risk of accident due to the fact that a deformation of the engine compartment directly or indirectly affects the pedals and these are moved into the leg room of the motor vehicle. The risks associated with this for the driver of the vehicle can be seen in severe injuries to the lower extremities as they may be caused by jamming between the pedals.

DE 196 31 212 C1 describes a device for mounting a pedal lever of a motor vehicle, which is accommodated in a housing pivotably around at least one severable bearing element. Due to an extension of the pedal level beyond its fulcrum point, a stop is created according to this document, which is supported against the cross rail of the motor vehicle under the action of an external force caused by an accident. The bearing element, which is a bearing bolt in this case, is destroyed due to the simultaneously occurring introduction of the movement of the brake booster connected to the pedal lever under the fulcrum point to the pedal lever, so that the pedal lever is released.

The facts that the pedal lever has, on the one hand, an increased own weight because of the stop to be provided additionally, and that, on the other hand, a local separation of the bearing element is not guaranteed, have proved to be disadvantageous in such a solution.

SUMMARY OF THE INVENTION

The technical object of the present invention is to provide a device for mounting a pedal lever, which reduces the risk of injury and the degree of severity of the injuries to the driver of the vehicle.

According to the invention, a device is provided for mounting a pedal lever of a motor vehicle, which is accommodated in a housing pivotably around at least one severable bearing element. A separating wedge is provided with at least one cutting edge provided on the separating wedge. The separating wedge is supported against a motor vehicle compound and is arranged facing the bearing element such that the bearing element is shorn off by the separating wedge as a consequence of the action of an external force due to a relative movement between the separating wedge and the bearing element.

At least one abutment may be provided at the housing for contacting a surface of the separating wedge and for guiding the surface in a slidingly movable manner. The separating wedge may have a wedge-shaped or arc-shaped cutting edge on the side facing the bearing element. The bearing element may pass through two walls of the housing, which are located at spaced locations from one another. The pedal lever may be arranged approximately centrally between the walls on the bearing element. A distance, which accommodates the cutting edge of the separating wedge, is present between the pedal lever and the wall surface of the respective associated wall on at least one side. The housing may be fastened at the front wall in the foot area of the driver's side of the motor vehicle and the motor vehicle component may be a cross rail. The bearing element having a predetermined breaking point each per said cutting edge may be a one-part or two-part bearing bolt. A blocking member may be provided at the housing which limits the yielding movement of the pedal in the direction of the interior space of the passenger compartment in an accident. The separating wedge may have a securing means for holding it at the housing.

Correspondingly, the device according to the present invention for mounting a pedal lever of a motor vehicle, which said pedal lever is accommodated in a housing pivotably around at least one severable bearing element, has a separating wedge, which is supported with one end against a component of the motor vehicle. The opposite end of this separating wedge is designed as a cutting edge and is arranged facing the bearing element such that the bearing element is shorn off by the separating wedge as a consequence of the action of an external force, which is caused, e.g., by an accident, and a resulting relative movement between the separating wedge and the bearing element.

The above-mentioned relative movement arises either from the deformation of the motor vehicle component or from the movement of the housing, which movement originates in turn from a deformation of parts of the motor vehicle. The shearing off, i.e., the destruction of the bearing element, is brought about correspondingly deliberately by the solution according to the present invention in order to guarantee the necessary protection of the occupants. A bearing bolt or a bearing bush, with which the pedal lever is mounted pivotably, may be used as the bearing element.

The device has, on the whole, a very simple design and may be manufactured nearly completely from light-weight materials, such as plastic, so that there are hardly any limitations concerning shaping, either.

It is proposed according to one embodiment of the present invention that an abutment be provided at the housing for contacting a surface of the separating wedge and for guiding same in a slidingly movable manner. This abutment may have a ramp function, so that the separating wedge can exert its shearing action on the bearing element to an increased extent.

To improve the shearing action, it is advantageous to equip the separating wedge with at least one wedge-shaped or arc-shaped cutting edge on the side facing the bearing element. As a result, the path the separating wedge must travel to completely severe the bearing element can be defined clearly and unambiguously.

The separating wedge may be held by a separate bracket between the cross rail and the bearing element. However, the separating wedge is preferably inserted loosely between the cross rail and the bearing element. As a result, complicated assembly may be eliminated.

Furthermore, a variant of the present invention can be seen in that the bearing element traverses two walls of the housing which are located at spaced locations from one another and that the pedal lever is arranged approximately centrally between these walls on the bearing element. A distance which accommodates the cutting edge of the separating wedge is now present between the pedal lever and at least one wall surface of the respective associated wall.

As was already mentioned above, the relative movement between the separating wedge and the bearing element may also be achieved by the motor vehicle component, to which the housing is fastened, being deformed. It is correspondingly meaningful to fasten the housing on the front wall in the foot area of the driver's side of the motor vehicle, because the front wall is usually deformed relatively greatly in an accident and the advantageous effect of the solution according to the present invention is achieved already at a rather early point in time as a result. The motor vehicle component may be correspondingly the closest cross rail, which is usually deformed only slightly even in serious accidents and thus makes it possible to optimally support the separating wedge.

To facilitate the shearing off, it is, moreover, appropriate and advantageous to provide the bearing element with at least one predetermined breaking point. The predetermined breaking point is located in the area of the cutting edge of the separating wedge. Furthermore, the bearing element may be designed as a one-part or two-part bearing bolt. The two-part design has special advantages concerning assembly. However, it shall be ensured in this case that each of the parts of the bolt will be shorn off by the separating wedge in an accident. However, a bearing bush, which can likewise be shorn off by the action of the shearing force, may also be provided as a bearing element corresponding to the present invention.

Since, e.g., the brake pedal of a motor vehicle is connected to a brake booster and the latter has a brake rod, the deformation of the front wall may have an especially great effect in this area, so that there is a risk that the pedal lever will move into the passenger compartment to an unacceptably great extent before the bearing element is shorn off. To eliminate this possibility, it is, furthermore, proposed that a blocking member, which limits a yielding movement of the pedal in the direction of the interior space of the passenger compartment in an accident, be provided at the housing in a solution according to the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a bearing element for a device for mounting a pedal lever.

DESCRIPTION OF THE PREFERRED EMBODIMENTS

Figure 1:
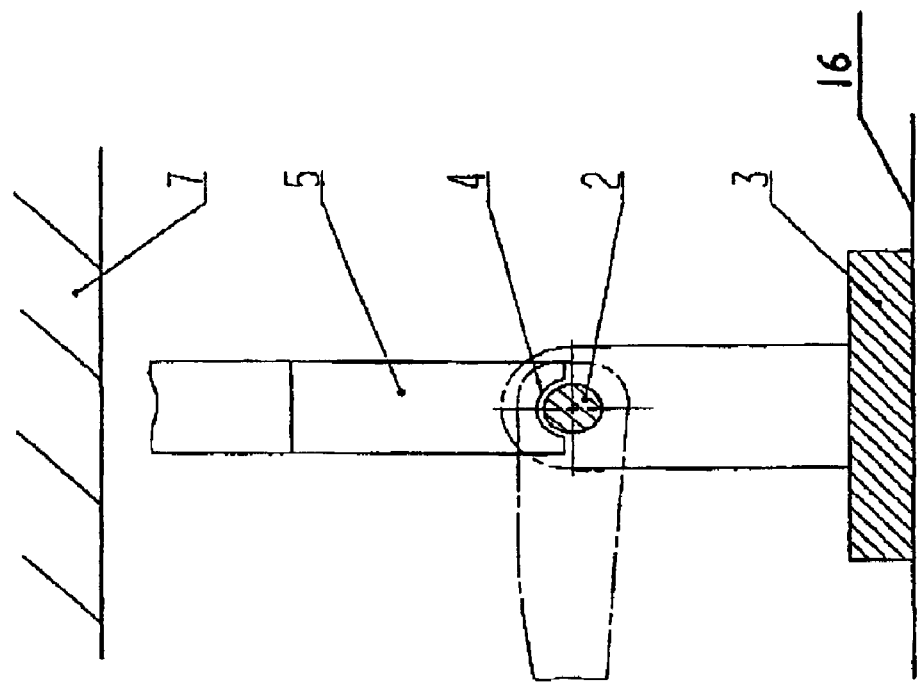
FIG. 1 is a sectional view of a detail of a device for mounting a pedal lever.
Figure 2:
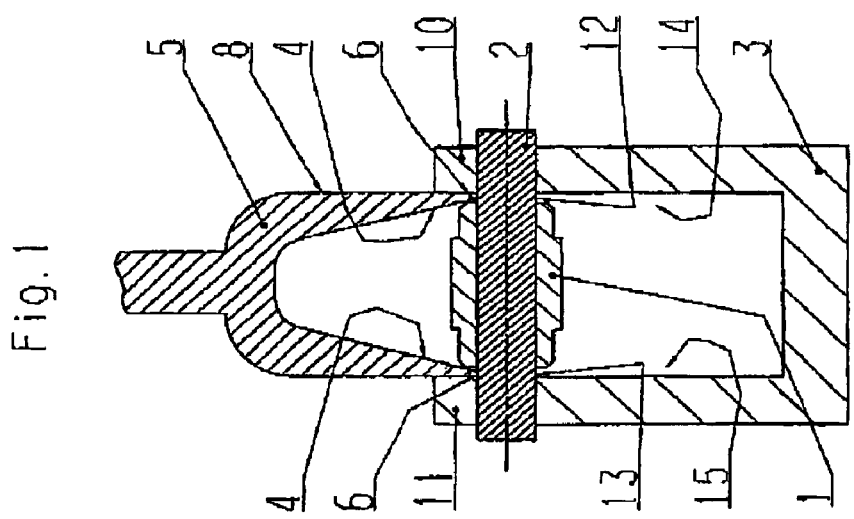
FIG. 2 is a side view of a detail of a device for mounting a pedal lever, shown partially in section.

Referring to the drawings in particular, for mounting a pedal lever 1 of a motor vehicle, the device shown in FIG. 1 contains a severable bearing element 2, which is accommodated pivotably in a housing 3. The housing 3 is fastened at the front wall 16 in the foot area of the motor vehicle. A section of a separating wedge 5 is designed as a cutting edge 4, which has the shape of an arc, as is clearly apparent from the representation in FIG. 2.

The separating wedge 5 is supported against a motor vehicle component 7. The motor vehicle component 7 is a cross rail in the example. The cross rail as the vehicle component 7 is useful for contacting the separating wedge because it is usually deformed only slightly even in serious accidents, so that a reliable, nearly unchangeable supporting of the separating wedge 5 becomes possible. As is apparent, the separating wedge 5 is inserted loosely between the cross rail 7 and the bearing element 2. Complicated assembly can be eliminated here. A securing means is not shown in the figures. The securing means acts only as a means against loss for the transportation of the device. The securing means is on each leg between the separating wedge 5 and the housing 3. The securing preferably consists of a soft material, so that the shearing action is not affected when needed.

The separating wedge 5 has a U-shaped cross section in the embodiment being shown, so that it has two cutting edges 4. The separating wedge 5 brings about the shearing off of the bearing element 2 while a shearing force is applied as a consequence of the action of an external force caused by an accident due to a relative movement between the separating wedge 5 and the bearing element 2.

This design of the separating wedge 5 is advantageous because the shearing action can be applied uniformly on two different areas of the bearing element 2 under the action of the external force, so that the bearing element can be severed with certainty and reliably when this is necessary. The bearing element 2 passes through two walls 10, 11 of the housing 3, which are located at spaced locations from one another. The pedal lever 1 is arranged on the bearing element 2 approximately centrally between these walls 10, 11, so that there is a distance 12, 13 on both sides of the pedal lever 1 between the pedal lever 1 and the wall surface 14, 15 of the respective associated wall 10 and 11. A cutting edge 4 on each part of the separating wedge 5 acts in these distances 12, 13. Furthermore, an abutment 6 on each part of the separating wedge 5 is present at the housing 3, at both wall surfaces 14, 15 for contacting and guiding the outer surface 8 of the separating wedge 5 in a slidingly movable manner. As is apparent from the representation in the figures, the abutment 6 and the associated surface 8 of the separating wedge 5 are flat surfaces, which permit the sliding movement of the components as a result.

As is apparent from FIG. 3, the bearing element 2 has two predetermined breaking points 9 and is designed as a one-part bearing bolt in this embodiment.

To avoid an unacceptably wide movement of the pedal lever into the passenger compartment, a blocking member, which is not shown in the figures and limits the yielding movement of the pedal in the direction of the interior space of the passenger compartment in an accident, is arranged at the housing 3.

While specific embodiments of the invention have been shown and described in detail to illustrate the application of the principles of the invention, it will be understood that the invention may be embodied otherwise without departing from such principles.

What is claimed is:

1. A motor vehicle pedal lever mount, comprising:
   a pedal lever;
   a housing;
   severable bearing element pivotably mounting said pedal lever;
   a separating wedge with at least one said cutting edge, said separating wedge being supported against a motor vehicle component, and separating wedge being arranged facing said bearing element such that said bearing element is shorn off by said separating wedge as a consequence of the action of an external force due to a relative movement between said separating wedge and said bearing element, said separating wedge having two cutting edges and said bearing element having two corresponding predetermined breaking points.

2. A device for mounting a pedal lever in accordance with claim 1, wherein said housing has at least one abutment for contacting a surface of said separating wedge and for guiding said surface in a slidingly movable manner.

3. A device for mounting a pedal lever in accordance with claim 1, wherein said housing is fastened at the front wall in a foot area of the driver's side of the motor vehicle and said motor vehicle component is a cross rail.

4. A device for mounting a pedal lever in accordance with claim 1, wherein said bearing element is a one-part bearing bolt.

5. A device for mounting a pedal lever in accordance claim 1, wherein said housing has a blocking member which limits the yielding movement of the pedal in a direction of an interior space of a passenger compartment whereby the blocking member limits the movement of the pedal upon the motor vehicle being in an accident.

6. A device for mounting a pedal lever in accordance with claim 1, wherein said separating wedge has a securing means for holding it at said housing.

7. A device for mounting a pedal lever in accordance with claim 1, wherein:
said housing is fastened on a front wall of a vehicle.

8. A device for mounting a pedal lever in accordance with claim 1, wherein:
said separating wedge has an arc-shaped cutting edge on a side facing said bearing element.

9. A motor vehicle pedal lever and mounting arrangement, comprising:
a pedal lever;
a housing;
severable bearing element pivotably mounting said pedal lever;
a separating wedge with a first cutting edge and a second cutting edge, said separating wedge being supported against a motor vehicle component, said separating wedge being arranged with each of said first cutting edge and said second cutting edge facing said bearing element to sever said bearing element with said first cutting edge and said second cutting edge upon an external force being applied to cause a relative movement between said separating wedge and said bearing element.

10. A motor vehicle pedal lever mount, comprising:
a pedal lever;
a housing;
severable bearing element pivotably mounting said pedal lever,
a separating wedge with at least one cutting edge, said separating wedge being supported against a motor vehicle component, said separating wedge being arranged facing said bearing element such that said bearing element is shorn off by said separating wedge as a consequence of the action of an external force due to a relative movement between said separating wedge and said bearing element, said separating wedge having a wedge-shaped cutting edge on a side facing said bearing element, said bearing element passing through two walls of said housing, said walls being located at spaced locations from one another, said pedal lever being arranged approximately centrally between said walls on said bearing element, and a distance, which accommodates said cutting edge of said separating wedge, is present between said pedal lever and said wall surface of said respective associated wall on at least one side.

11. A pedal mount arrangement comprising:
a housing including two side walls spaced from each other;
a bearing element arranged in said housing and passing through both said side walls;
a pedal lever pivotally arranged on said bearing element and between said side walls, a side of said pedal lever being spaced from one of said side walls;
a separating wedge having a cutting edge, said cutting edge being arranged facing said bearing element, said wedge and said bearing element being arranged to have said wedge shear through said bearing element when said wedge is forced into said bearing element, said cutting edge being arranged between a plane of said one side wall and a plane of said side of said pedal level.

12. A device for mounting a pedal lever in accordance with claim 11, wherein:
said cutting edge is arranged between said pedal lever and said one sidewall.

13. A device for mounting a pedal lever in accordance with claim 11, wherein:
said separating wedge has another cutting edge;
another side of said pedal lever is spaced another one of said side walls;
said another cutting edge is arranged between a plane of said another side wall and a plane of said another side of said pedal.

14. A device for mounting a pedal lever in accordance with claim 13, wherein:
said pedal lever is arranged substantially centrally between said side walls.

15. A device for mounting a pedal lever in accordance with claim 13, wherein:
said separating wedge has an outer surface;
said walls of said housing include wall surfaces contacting and guiding said outer surface of said separating wedge toward said bearing element.

16. A device for mounting a pedal lever in accordance with claim 15, wherein:
said outer surface of said separating wedge slides against said wall surfaces of said housing.

17. A device for mounting a pedal lever in accordance with claim 15, wherein:
said separating wedge includes an abutment present at said housing, said outer surface of said separating wedge being in contact with said abutment.

18. A device for mounting a pedal lever in accordance with claim 17, wherein:
said abutment and said outer surface of said separating wedge are substantially flat surfaces.

19. A device for mounting a pedal lever in accordance with claim 13, wherein:
said separating wedge has a U-shaped cross section.

20. A device for mounting a pedal lever in accordance with claim 19, wherein:
said cutting edge and said another cutting edge from a shank of said separating wedge.

* * * * *